Figure 1:
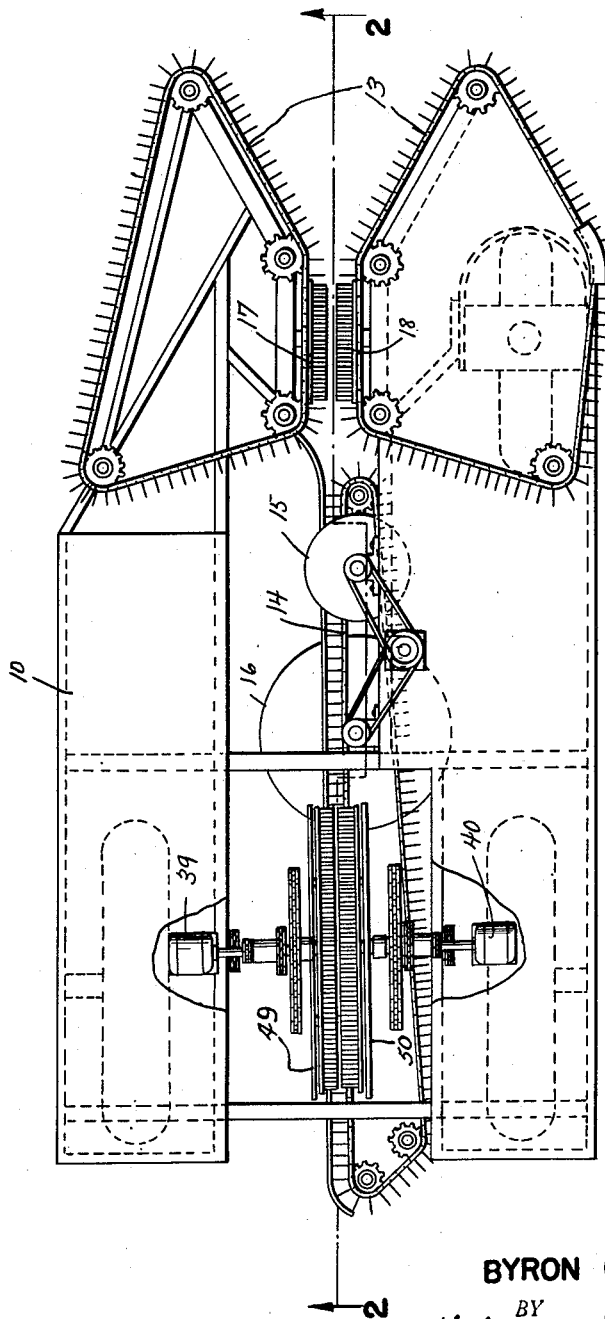

INVENTOR.
BYRON C. THOMSON
BY
Wilkinson + Mawhinney
ATTORNEYS

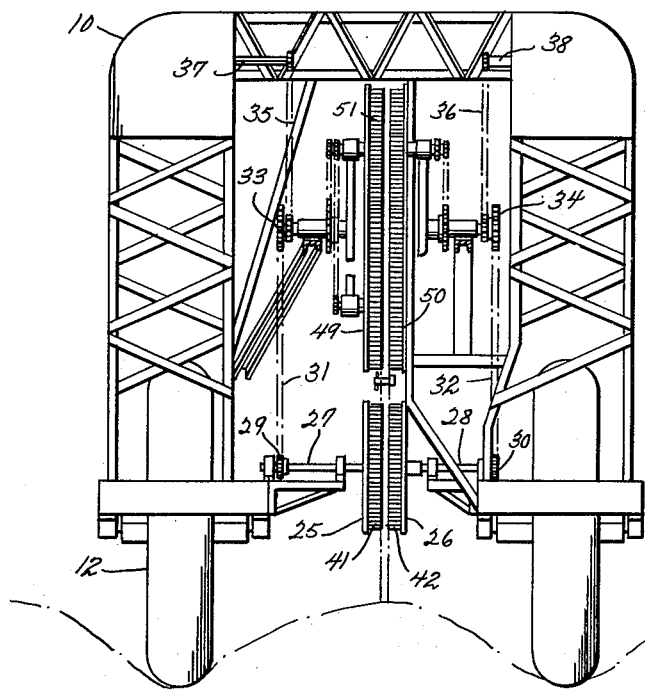
FIG. 4.
FIG. 5.
FIG. 6.
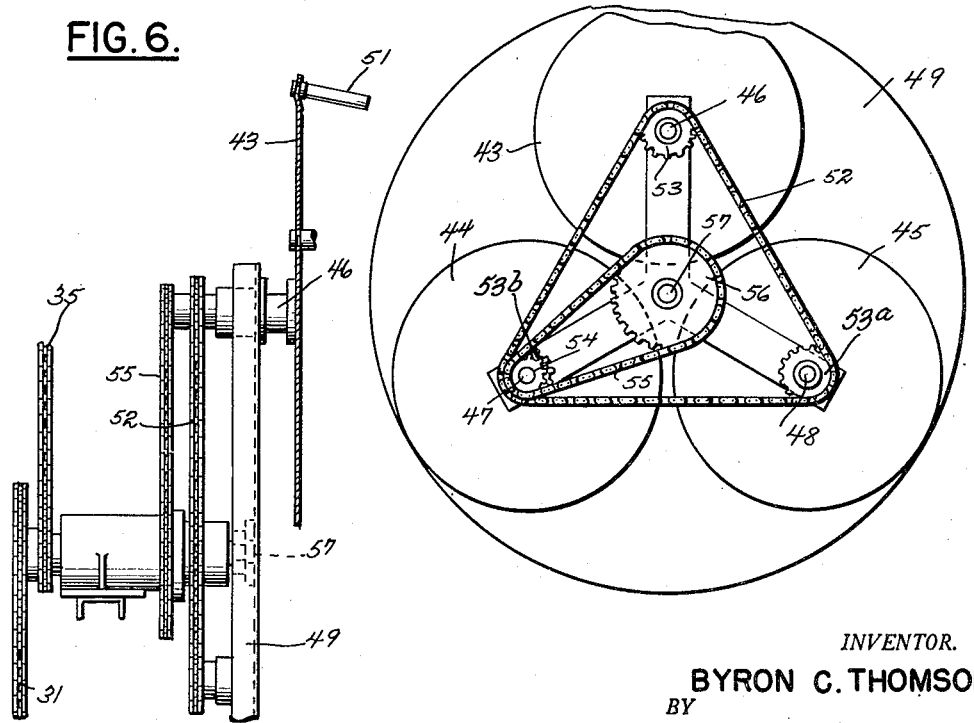
INVENTOR.
BYRON C. THOMSON
BY
Wilkinson & Mawhinney
ATTORNEYS Patented June 12, 1951

2,556,509

UNITED STATES PATENT OFFICE 2,556,509

CANE CLEANING DEVICE

Byron C. Thomson, Thibodaux, La.

Application December 20, 1948, Serial No. 66,329

8 Claims. (Cl. 56—17)

The present invention relates to improvements in cane cleaning devices and more particularly relates to a device for achieving defoliation of agricultural crops made up of plants having stalks with leaves, such as sugar cane and other like crops.

Many attempts have been made heretofore to provide a satisfactory machine for stripping the leaves from sugar cane but none of these prior attempts have been commercially successful.

The system now used in Louisiana for harvesting sugar cane mechanically is to cut the cane, top and bottom and pile it into "heap rows" with the leaves and trash still on the stalks. During sunny weather this trash to a large extent may be burned from the cane. During cloudy or rainy weather, however, the trash remains on the cane and is transported to the factory and put into the milling process.

Such trash has caused much trouble in the manufacturing of sugar, so much so that with the advent of mechanical harvesting there has been a steady decline in the recovery of sugar per ton of cane. This problem has now become so serious that it might be stated in general that factory profits under normal conditions depend to a large extent upon how much rainfall and cloudy weather happens during the harvest.

Accordingly, the main objective is to remove leaves and trash from the cane stalks, whether in the field, at the factory, or at some intermediate point so that the cane may enter the factory properly prepared for milling.

The importance of this operation insofar as Louisiana is concerned cannot be over emphasized. Labor is not available in sufficient quantities to strip the cane manually as had been done formerly. Therefore, mechanical means must be used and, unless the trash can be taken from the cane by the mechanical means the process of harvesting is only partially complete. Not only does the adhering trash when wet add materially to the field cost of transporting the cane from the fields to the mills, but it also has an adverse effect upon the extraction of sugar from the cane juices.

It is a further object of the invention to provide a cane cleaning device which may be used in a number of different ways: for instance (1) on a harvester traveling through the fields and cleaning cane in conjunction with the harvesting operation; or (2) on a machine moving through the cane fields containing the cleaning device but no cutting knives, the purpose of such a machine being to strip the cane while it is attached to the ground, thus preparing it for the harvesting operation which will follow; or (3) on a stationary cleaning device with the cane being cut in the fields and transported to the cleaner, then conveyed through the cleaning discs which are rotating but not moving forward.

The accompanying drawings, which show only one embodiment of the invention illustrate the device as incorporated in a cane harvester.

With the foregoing and other objects in view, the invention will be more fully described hereinafter, and will be more particularly pointed out in the claims appended hereto.

Figure 2:
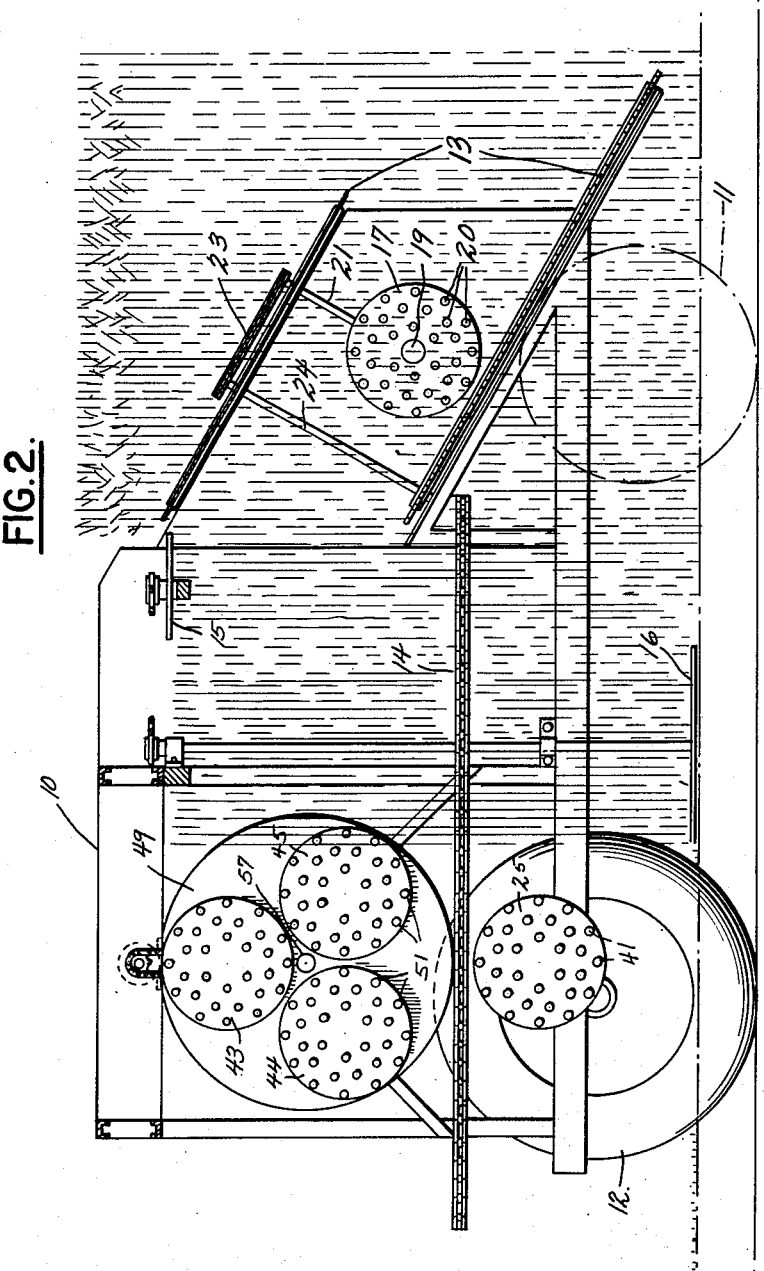
Figure 3:
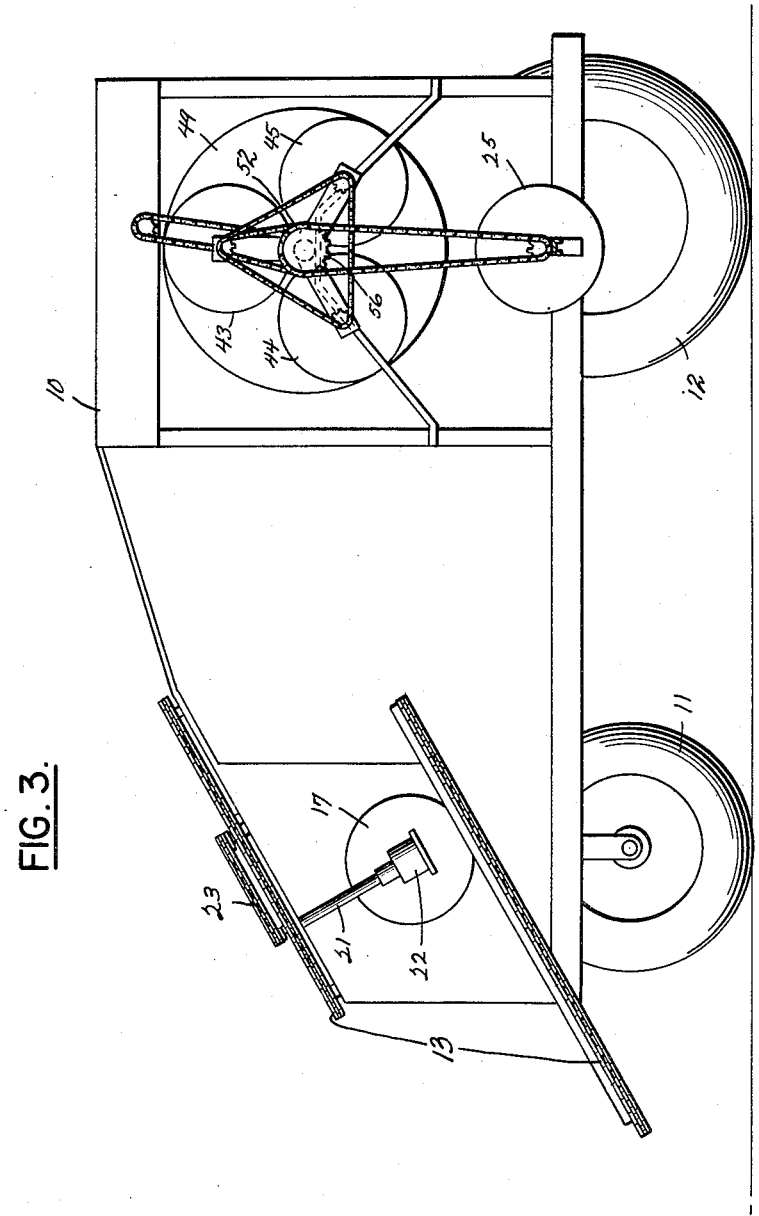

In the drawings, wherein like symbols refer to like or corresponding parts throughout the several views, Figure 1 is a top plan view of a form of cane harvester embodying therein an improved cane cleaning device constructed according to the present invention with parts omitted for clarity, Figure 2 is a longitudinal central section taken on the line 2—2 in Figure 1, Figure 3 is a side elevational view of a form of harvester equipped with the present invention, Figure 4 is a rear elevational view of a form of cane harvester equipped with the improved cane cleaning device, Figure 5 is an enlarged fragmentary elevational view of a form of cleaning unit, and Figure 6 is an end elevational view of the cleaning unit and driving mechanism with parts broken away and parts shown in section.

Referring more particularly to the drawings, 10 designates a cane harvester adapted to travel through the field on the front and rear wheels 11 and 12 and having down the longitudinal center thereof a channel to permit the machine to pass over the growing cane stalks. The usual pick-up endless chains 13 are shown in the forward portion of the harvester which chains move together in their inner adjacent runs to guide the cane stalks into the longitudinal channel. One or more carrier chains 14 are mounted upon the harvester to walk along with the cane stalks as the harvester moves forwardly; or in other words to advance the cane stalks through the longitudinal channel. The carrier chain 14 conveys the cane through the harvester and delivers it to the piler (not shown) which is mounted at the rear of the channel.

One or more rotary disc cutters 15, known as the topper, are so placed on the harvester as to sever the tops of the stalks as the same move through the harvester. The topper 15 will be arranged to cut the cane at the highest level, this blade 15 being adjustable for cutting the cane at the height desired. This adjustment is controlled by the harvester operator. The cane is firmly held by the carrier chain 14 when the topping operation is taking place.

The bottom cutter blade 16 is also carried by the harvester in position to cut the cane just above the ground level. The bottom blade 16 is displaced on the harvester backwardly of the topper 15 so as to sever the cane from the ground just after the cane is topped by the topper 15. The bottom blade 16 is also adjustable as to height and this adjustment is under the control of the harvester operator. The cane is firmly held by the carrier chain 14 when being severed from the ground by the bottom blade 16.

The above described structure is all well known cane harvester structure and forms no part of the present invention.

The improved cane cleaning device comprises one or more pairs of discs such for instance as the discs 17 and 18 which are mounted at the forward portion of the machine on substantially horizontal axis 19 to rotate in a substantially vertical direction. One of these discs is located at one side of the harvester channel and the other disc at the opposite side thereof. Projecting from the adjacent faces of the discs and toward one another are fingers 20. These fingers are preferably flexible or resilient and may with advantage be made of rubber, the inner free ends of which approach one another closer than the average diameter of the cane being treated. These discs 17 and 18 may be rotated by any suitable means as for instance by power derived from the harvester propelling motor. In Figure 3 is shown a shaft 21 connected by gearing 22 to the disc shaft or axis 19. The upper end of this shaft has affixed thereto a sprocket engaged by a chain 23 connected with a sprocket on a shaft 24 which may be connected by a sprocket to one of the pick-up chains 13. The discs 17 and 18 are preferably rotated in opposite directions.

At the rear of the harvester may also be mounted numbers of other discs, for instance a pair of discs 25 and 26 carried by shafts 27 and 28 mounted in appropriate bearings in the harvester framework and having sprockets 29 and 30 connected by chains 31 and 32 driven by sprockets 33 and 34. These sprockets 33 and 34 are driven by chain and sprocket or other gearing 35 and 36 from shafts 37 and 38 driven by electric or other motors 39 and 40 or from the engine on the harvester. The discs 25 and 26 have rubber or other pins or fingers 41 and 42 projecting toward one another and adapted to wipe across the cane stalks. The discs 25 and 26 are preferably rotated in opposite directions.

Other cleaning units are mounted above the discs 25 and 26 and comprise planetary de-leafing devices comprising an association of a plurality of pairs of rubber-finger discs, three such pairs 43, 44 and 45, each pair rotating in relatively opposite directions about its own axis 46, 47 and 48 and being carried by pairs of large rotary discs 49 and 50. The rubber pins of the discs 43, 44 and 45 are indicated at 51 and project toward one another from opposed discs to wipe across the cane stalks.

The discs 43, 44 and 45 have their axes or shafts 46, 47 and 48 all connected to be driven in the same direction by a chain 52 running over sprockets 53, 53$^a$ and 53$^b$ affixed to the disc shafts. One shaft 47 is driven by a sprocket 54 from a chain 55 from a center sprocket 56 on the center shaft 57 on which the large discs 49 and 50 are rotatably supported. The large discs 49 and 50 are driven in preferably opposite directions by means of the chain and sprocket or other gearing 35, 36. Each large disc 49, 50 has its independent gearing as shown in Figures 5 and 6 whereby not only the large discs 49, 50 are driven in relatively opposite directions but also the rubber-fingered small discs 43, 44 and 45 on one side of the cane are driven in the opposite rotational sense from those on the opposite side of the cane.

In the use of the device, the cane harvester proceeds through the field in the usual manner gathering the cane stalks by the pick-up chains 13 into the throat of the channel where such stalks are passed to the carrier chain 14 and are topped in the usual manner by the rotary cutter 15 and subsequently severed from the ground by the bottom blade 16 to then move on through the harvester and be transferred to the piler at the rear of the harvester.

In the throat of the pick-up chains 13 and while the cane is being held at upper and lower portions by these pick-up chains 13 the same is subjected to the de-leafing action of the numerous rubber fingers 20 on the oppositely rotating discs 17 and 18.

In a similar manner the rear lower end portions of the cane are subjected to the de-leafing action of the lower pair of discs 25, 26 while the upper portion of the cane stalks are subjected to the de-leafing action of the numerous rubber fingers 51 on the disc sets 43, 44 and 45. The rubber fingers on these latter discs are given not only rotary movements about their own axes 46, 47 and 48 but the motion of revolution communicated to the pairs of discs 43, 44 and 45 by the rotary action of the large discs 49, 50 in being driven about their centers 57. This duplex motion is a planetary movement which is simultaneously imposed on the rubber pins 51, it being understood that the motion is relatively reversed as to the pins on opposite sides of the cane. The rubber fingers wipe and slash at the cane in all directions in the plane through which the cane passes. The counter-rotation of the right and left disc assemblies tends to balance the forces created by the fingers in wiping the cane. Such forces are sufficient to clean the cane of leaves and trash.

More over the rotating finger discs at the front of the machine aid in straightening the cane as it enters the pick-up chains.

The fingers on the various discs may be made of rubber, plastic, metal or fibrous material. They may be smooth or serrated. From actual experience, serrated rubber fingers do less harm to the cane stalk and actually remove the leaves more efficiently. The rubber fingers are self cleaning.

The rotating discs together with the rubber flexible fingers provide an effective means of gently rubbing and scraping the leaves from the cane without damage to the stalks and without the leaves and trash collecting or winding up on the cleaning device and choking the operation.

The upper rear set of three oppositely-rotating discs not only increases the number of times the flexible fingers rub across the cane but also changes their direction of travel from horizontal to vertical across the stalks and up and down the stalks.

The large discs 49 and 50 may be simply spiders or other forms of carriers for the individual pairs of discs 43, 44 and 45. The rubber or flexible fingers have the great advantage of not offering resistance to the entry of the cane between the discs. Therefore, there is no breaking of the stalks.

Although I have disclosed herein the best form of the invention known to me at this time, I reserve the right to all such modifications and changes as may come within the scope of the following claims.

What I claim is:

1. A cane cleaning device comprising a plurality of pairs of rotating members, de-leafing pins projecting toward one another from said pairs of members, and rotating supports for said pairs of members rotating about center axes from which the axes of rotation of the pairs of members are eccentric.

2. A cane cleaning device comprising rotary supports, drive means for said supports, pairs of members carried by said supports and rotating on the supports on axes offset from the axis of rotation of the supports, and de-leafing pins carried by said members and projecting toward one another in position to receive and scrape the cane stalks introduced between the members.

3. A cane cleaning device comprising a pair of rotary supports mounted to rotate in approximately parallel planes, means for rotating said supports, pairs of members, one member of each pair carried by an opposed support and substantially spaced in parallel relation and mounted to rotate on axes offset from the axis of rotation of the supports, means for rotating said members independently of the rotation of the supports, and de-leafing fingers projecting from the supports toward one another in position to scrape cane stalks introduced between the members.

4. A cane cleaning device as claimed in claim 3 characterized by the fact that the supports are counter-rotated.

5. A cane cleaning device as claimed in claim 3 characterized by the fact that the opposed members are counter-rotated.

6. A cane cleaning device as claimed in claim 3 characterized by the fact that the supports are counter-rotated and the members are also counter-rotated.

7. For use with a cane harvester having a carrier chain, a cane cleaning device positioned on the harvester to defoliate the cane while held by said carrier chain and comprising rotating members, deformable fingers projecting from said members into such proximity as to press upon and scrape the cane stalks as the same are moved through the cleaning device by the carrier chain, said rotating members being in multiple pairs rotatable individually about their own axes, and rotatable supports mounted on the harvester carrying the multiple pairs of rotating members with the axis of rotation of said members eccentric to the axis of rotation of said supports to cause the fingers to move both horizontally and vertically while rotating in contact with the cane stalks held by the carrier chain.

8. For use with a harvester having pick-up chains, a topper, a bottom cutter blade and a carrier chain, a cleaning device comprising a pair of rotating members between the pick-up chains, defoliating fingers projecting from the members in position to scrape the cane stalks as the same are held by the pick-up chains, a second pair of rotary members at the rear portion of the harvester below the carrier chain, defoliating pins projecting from the said second pair of members for engaging lower portions of the cane stalks, and multiple pairs of members mounted to rotate about their own axes above the carrier chain at the rear portion of the harvester, pins projecting from the multiple members in position to scrape upper portions of the cane stalks held by said carrier chain, and rotating supports carrying said multiple pairs of members to cause the members to partake of a planetary motion.

BYRON C. THOMSON.

REFERENCES CITED

The following references are of record in the file of this patent:

UNITED STATES PATENTS

| Number | Name | Date |
| --- | --- | --- |
| Re. 2,424 | Prall | Dec. 18, 1866 |
| 508,860 | Barton | Nov. 14, 1893 |
| 1,168,467 | Bell | Jan. 18, 1916 |
| 1,265,244 | Piatt | May 7, 1918 |
| 1,672,445 | Byberg | June 5, 1928 |
| 2,194,617 | Scott | Mar. 26, 1940 |
| 2,458,299 | Powers | Jan. 4, 1949 |
| 2,489,963 | Henley | Nov. 29, 1949 |
| 2,506,054 | Agee | May 2, 1950 |

FOREIGN PATENTS

| Number | Country | Date |
| --- | --- | --- |
| 572,040 | Great Britain | Sept. 20, 1945 |